United States Patent [19]
Willer et al.

[11] Patent Number: 5,347,696
[45] Date of Patent: Sep. 20, 1994

[54] METHOD FOR MANUFACTURING A MULTI-LAYER CAPACITOR

[75] Inventors: Josef Willer, Riemerling; Hermann Wendt, Grasbrunn; Hans Reisinger, Gruenwald, all of Fed. Rep. of Germany

[73] Assignee: Siemens Aktiengesellschaft, Munich, Fed. Rep. of Germany

[21] Appl. No.: 164,719

[22] Filed: Dec. 10, 1993

[30] Foreign Application Priority Data

Jan. 14, 1993 [DE] Fed. Rep. of Germany ....... 4300808

[51] Int. Cl.5 ............................................. H01G 4/10
[52] U.S. Cl. .................................. 29/25.42; 156/646; 156/650; 361/304
[58] Field of Search ............... 29/25.42; 361/304, 309; 156/646, 650

[56] References Cited

U.S. PATENT DOCUMENTS 4,453,199  6/1984  Ritchie et al. .
4,700,457  10/1987  Matsukawa .
5,135,883  8/1992  Bae et al. .
5,153,813  10/1992  Oehrlein et al. .

FOREIGN PATENT DOCUMENTS 0070380  1/1983  European Pat. Off. .
4221959  1/1993  Fed. Rep. of Germany .

*Primary Examiner*—Carl E. Hall
*Attorney, Agent, or Firm*—Hill, Steadman & Simpson

[57] ABSTRACT

For manufacturing a multi-layer capacitor, a layer structure (2, 3, 4) is applied onto a substrate (1), said layer structure comprising conductive layers (2, 4) and dielectric layers (3) in alternation and successive conductive layers (2, 4) therein being respectively formed of one of two different materials which are selectively etchable relative to one another. Two openings (6, 8) are produced in the layer structure (2, 3, 4), whereby under-etchings (21, 41) are formed in the first opening (6) by selective etching of the one material and are formed in the second opening (8) by selective etching of the other material, so that only the conductive layers (2, 4) of the non-etched material respectively adjoin contacts (91, 92) introduced into the openings (6, 8).

17 Claims, 2 Drawing Sheets

METHOD FOR MANUFACTURING A MULTI-LAYER CAPACITOR

BACKGROUND OF THE INVENTION

1. Field of the Invention

The present invention is directed to a method for producing a multi-layer capacitor.

2. Description of the Prior Art

Multi-layer capacitors are employed as passive, discrete components or in integrated circuits. Among other things, multi-layer capacitors are manufactured as film capacitors and as ceramic capacitors. In the film capacitors, films are printed with metallizations and subsequently wound under pressure. Portions are cut out of the resulting coil to form individual film capacitors. The metallization is printed on in such a way that only every second metallization layer is adjacent at the edges of the film capacitor. The metallization lying therebetween is set back from the edge. Only every second metallization layer is contacted in this way by contacts applied onto the edges. The film forms the dielectric. For production-associated reasons, the film cannot be selected arbitrarily thin.

For manufacturing ceramic capacitors, ceramic films are coated with metal films by silk screening. The coated ceramic films are stacked and subsequently sintered. The metal films are arranged such that every second metal film extends up to the edge of the ceramic film, whereas the metal film lying therebetween is set back from the edge. Contacts are applied onto the edges of each second metal film. The ceramic films used in manufacturing ceramic capacitors are typically produced in a thickness of 20 μm. A ceramic capacitor usually has approximately ten layers.

SUMMARY OF THE INVENTION

It is an object of the present invention to provide a method for manufacturing a multi-layer capacitor with thinner layers to manufacture capacitors having greater capacitance given the same structural size.

The object of the present invention is inventively achieved in a method for producing a multi-layer capacitor, comprising the steps of applying a layer structure having a first conductive layer of a first material and a second conductive layer of a second material, in alternation with dielectric layers (the second conductive layer being mutually selectively etchable relative to the first material) onto a substrate; conducting a first etching to form a first opening in the layer structure using a first mask as an etching mask; conducting a second etching of the second material conductive layer by selectively removing the second material relative to the first material thereby creating first under-etchings in the layer structure neighboring the first opening; conducting a third etching to form a second opening in the layer structure using a second mask as a etching mask; conducting a fourth etching of the first material conductive layers by selectively removing the first material relative to the second material thereby creating second under-etchings in the layer structure neighboring the second opening; forming a first contact in said first opening, the first contact contacting only the first material conductive layers due to the first under-etchings; and forming a second contact in the second opening, the second contact contacting only the second material conductive layers due to the second under-etchings.

A layer structure is applied onto a substrate that can be a semiconductor, a metal or an insulator. The layer structure has conductive layers and dielectric layers in alternation. Successive conductive layers are formed of a first material and of a second material different therefrom which are mutually selectively etchable relative to one another. A first opening is etched into the layer structure. All layers are etched down to the substrate at approximately the same rate. In a second etching step, which selectively removes the second material relative to the first material, the conductive layers of the second material are etched, so that under-etchings arise in the layer structure neighboring the first opening. Using a second mask as an etching mask, a second opening is etched in the layer structure in a third etching step. Again all layers are etched down to the substrate at approximately the same rate. In a fourth etching step, which selectively removes the first material relative to the second material, the conductive layers of the first material are etched so that under-etchings arise in the layer structure neighboring the second opening. The multi-layer capacitor is finished by forming a first contact in the first opening, which, due to the under-etchings, is only in contact with the conductive layers of the first material, and of a second contact in the second opening, which, due to the under-etchings, is only in contact with the conductive layers of the second material.

Methods known in semiconductor technology can be utilized for producing the layers in the method of the invention. Layers having even less thickness (for example, 100 nm) can thus be produced in a well-controlled manner.

The second and fourth etching steps for forming the under-etchings also selectively attack the corresponding material relative to the dielectric layers. The under-etchings are formed between two dielectric layers. The conductive layers that are contacted in the opening remain covered by the dielectric layers at the top and bottom. The arc-over resistance in the finished multi-layer capacitor is enhanced in this way.

It lies within the framework of the invention to form the conductive layers of doped polysilicon or various metals. In particular, it lies within the framework of the invention to form the conductive layers of the first material of tungsten and the conductive layers of the second material of tungsten silicide. It is especially advantageous to select $WSi_2$ or $WSi_{0.4}$, as tungsten silicide, since these silicides have especially pronounced etching properties. All known dielectrics such as $SiO_2$, $Si_3N_4$, $Ta_2O_5$, etc. are suitable as dielectric layers.

When the conductive layers are formed of tungsten and tungsten silicide, then the dielectric layers may be formed of $Si_3N_4$. This layer sequence can be produced by cosputtering in the same sputtering system with targets of at least silicon, tungsten and tungsten silicide available.

When the conductive layers are formed of tantalum and TaN and the dielectric layers are formed of $Ta_2O_5$, then deposition from a single target in a sputtering system may be used to form the layer structure. Since the layers are deposited in a single step, economical process management is possible.

The first mask and the second mask are produced, for example, of photoresist in an optical lithography process or silk screening paste in a silk screening process.

Dry etching methods using fluoride-containing gas are particularly suitable for the etching. Both $SF_6$ as well as CF$_4$ can be used as etching gas. For setting the selectivity in the second and fourth etching steps, at least one of the gases O$_2$, Ar, N$_2$, H$_2$ or He is respectively mixed with the etching gas. It is known that the addition of these gases leads to a selectivity of the etching.

BRIEF DESCRIPTION OF THE DRAWINGS

The present invention shall be set forth in greater detail below with reference to the FIGS. and to an exemplary embodiment.

DESCRIPTION OF THE PREFERRED EMBODIMENTS

Figure 1:
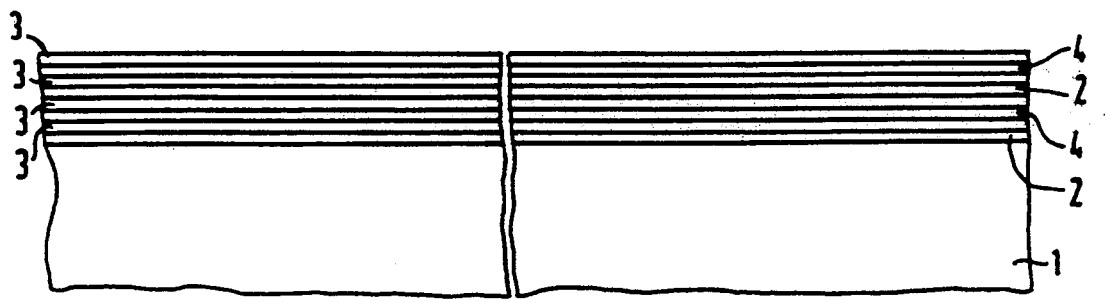
FIG. 1 shows a layer structure on a substrate in the present invention.
Figure 2:
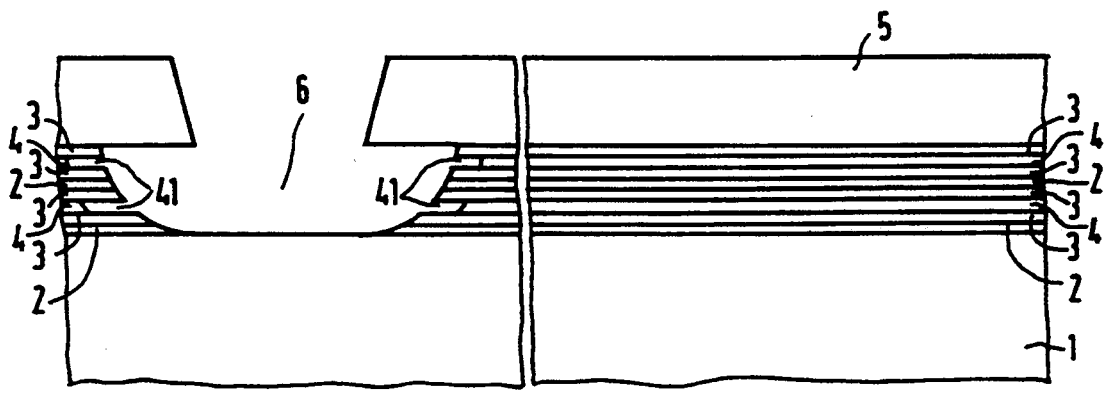
FIG. 2 shows the layer structure in which a first opening with under-etchings has been formed in the present invention.

A layer sequence is multiply deposited on a substrate 1 which, for example, is nonconductive in a sputtering system. The layer sequence has a conductive layer 2 of a first material, a dielectric layer 3, a conductive layer 4 of a second material and a further dielectric layer 3 (See FIG. 1 ). The layer sequence can be repeated as often as desired. The first material and the second material are selected such that the first material can be etched selectively to the second material and the second material can be etched selectively relative to the first material.

Figure 5:
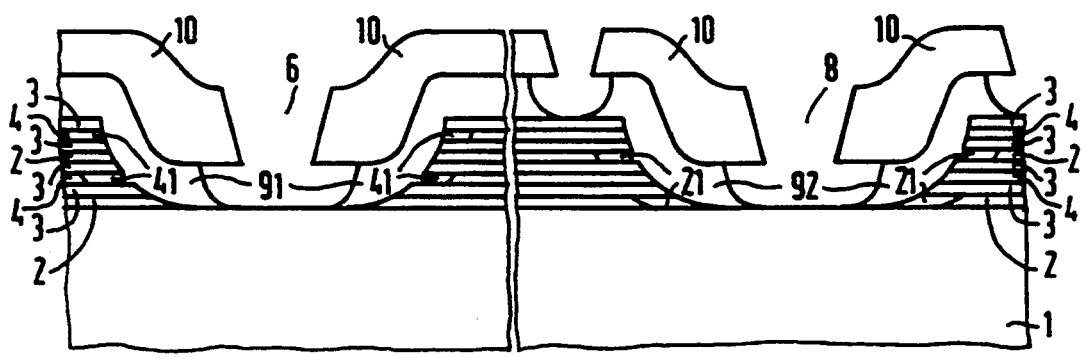
FIG. 5 shows the layer structure after the structuring of the contact layer into contacts in the present invention.

A first mask 5 is produced at the surface of the layer structure (see FIG. 5). The first mask 5, for example, is manufactured of photoresist by optical lithography. A first etching step wherein the first mask 5 is used as etching mask, a first opening 6 is produced in the layer structure. The first etching step ensues, for example, by wet-chemical etching or by isotropic or anisotropic dry etching. All layers are essentially etched at approximately the same rate in the first etching step. It is advantageous when the surface of the substrate is resistant to the first etching step.

In a second etching step, an etchant that selectively etches the second material is used to produce under-etchings 41 by etching the conductive layers 4 of the second material. Since the second etching step selectively ensues relative to the first material and relative to the material of the dielectric layers 3, the dielectric layers 3 and the conductive layers 2 of the first material project beyond the under-etchings 41.

Figure 3:
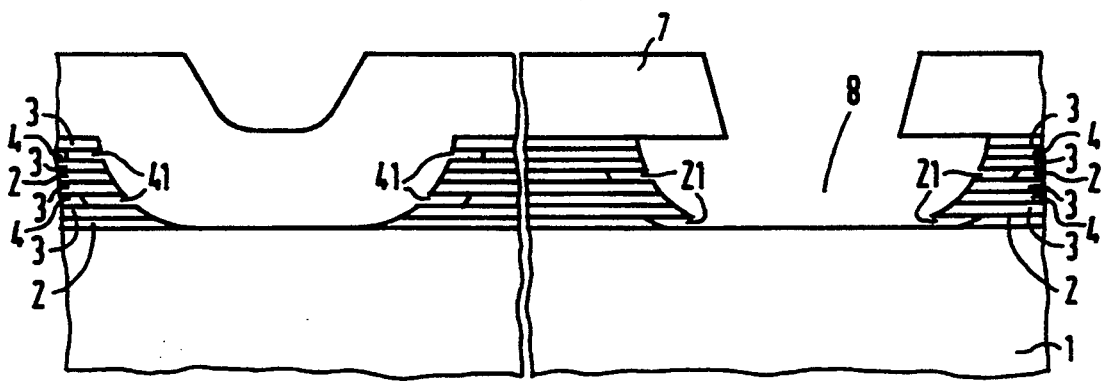
FIG. 3 shows the layer structure in which a second opening having under-etchings has been formed in the present invention.

After removal of the first mask 5, a second mask 7 is applied which, for example, is formed of photoresist by optical lithography (see FIGS. 3). The second mask 7 completely covers the first opening 6. A second opening 8 is produced in the layer structure in a third etching step. For example, by using wet-chemical etching or isotropic or anisotropic dry etching, the third etching step essentially etches all layers at approximately the same rate. It is expedient when the surface of the substrate 1 is not attacked in the third etching step.

Using an etchant that selectively attacks the first material relative to the second material and the material of the dielectric layers 3, under-etchings 21 are formed in a fourth etching step by etching the conductive layers of the first material. These under-etchings 21 have the dielectric layers 3 and the conductive layers 4 of the second material laterally projecting beyond them.

Figure 4:
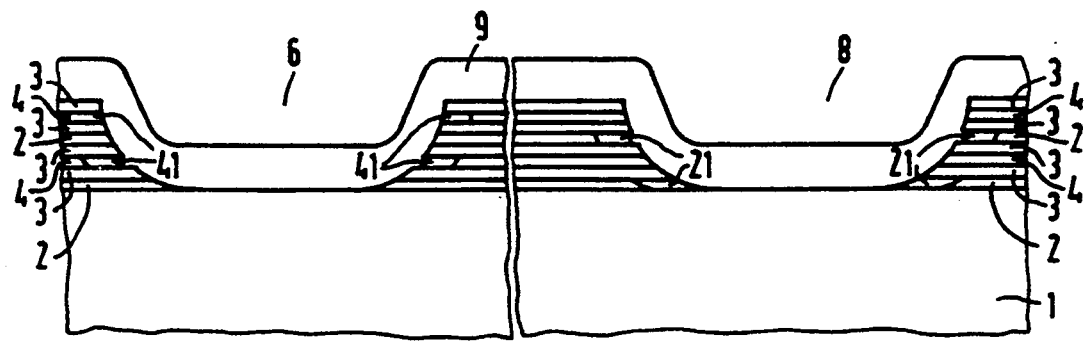
FIG. 4 shows the layer structure onto which a contact layer was applied in the present invention.

After removal of the second mask 7, a metal layer 9 is applied surface-wide. The metal layer 9 is deposited in a directed deposition method, for example, by sputtering or vapor-deposition. In the region of the first opening 6, the metal layer 9 is therefore in contact only with the conductive layers 2 of the first material, whereas it is separated from the conductive layers 4 of the second material by the under-etchings 41. In the region of the second opening 8, the metal layer 9 is in contact with the conductive layers 4 of the second material, whereas it is insulated from the conductive layers 2 of the first material by the under-etchings 21 (see FIG. 4).

A third mask is applied as etching mask for structuring the metal layer 9. First contacts 91 and second contacts 92 thereby occur. The first contacts 91, which are arranged at least along the sidewalls of the first opening 6, contact the conductive layer 2 of the first material. Similarly, the second contacts 92, arranged at least along the sidewalls of the second opening 8, contact the conductive layers 4 of the second material (see FIG. 5).

Figure 6:
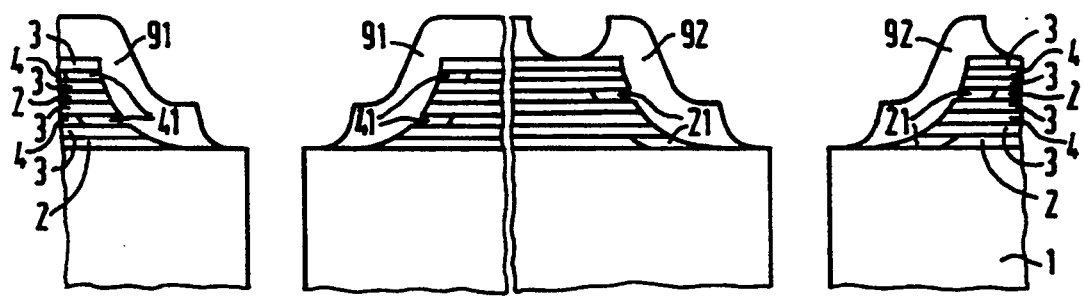
FIG. 6 shows multi-layer capacitors manufactured according to the method of the invention after being detached in the present invention.

The surface of the substrate 1 is thereby uncovered in the region of the floor of the first opening 6 and the second opening 8. These regions of the substrate surface that have been etched free can define the saw frame for detaching discrete capacitors (see FIG. 6).

In the structuring of the metal layer 9, the metal layer 9 is interrupted at the surface of the layer structure, so that the first contact 91 and the second contact 92 are insulated from one another.

According to a first exemplary embodiment, the dielectric layers 3 are produced of silicon nitride (Si$_3$N$_4$). The conductive layers 2 of the first material are produced of tungsten and the conductive layers 4 of the second material are produced of tungsten silicide. WSi$_2$ or amorphous WSi$_{0.4}$ is thereby preferably used. The layer structure is produced in a sputtering system that has targets of at least Si, W and Wsi$_x$. Si$_3$N$_4$ is thereby formed, for example, by actively sputtering the silicon target off.

A dry etching process using etching gas SF$_6$, which supplies the necessary F-containing radicals, is used for structuring the layers. The selectivity in the second etching step is set by adding O$_2$ in the percentage range of, preferably 30%. The etching rate WSi$_x$ is elevated by approximately five times in comparison to pure SF$_6$ by adding this amount of O$_2$. The etching rate of pure tungsten, by contrast, decreases as a result thereof.

N$_2$ is added to the SF$_6$ in the fourth etching step for setting the selectivity. The etching rate for pure tungsten is elevated by approximately six times by adding N$_2$ in an amount of 60%.

The selectivity of the etching, in addition to being set by adding O$_2$ and N$_2$, can also be set by adding Ar, H$_2$ and He. The combination of the gases as well as the process parameters are thereby dependent on the etching system used.

According to a second exemplary embodiment, the dielectric layers 3 are formed of Ta$_2$O$_5$. Higher capacitances are thereby achieved in the finished capacitor. The conductive layers 2 of the first material are formed, for example, of pure tantalum and the conductive layers 4 of the second material are formed of TaN. This layer structure is formed, for example, by deposition in a sputtering system having a single target of pure tantalum. TaN is thereby produced by adding $N_2$ to the sputtering gas Ar, whereas $Ta_2O_5$ is produced by adding $O_2$ to the sputtering gas Ar. Reactive ion etching with etching gases on the basis of fluorine chemistry are similarly used here for structuring the layer structure. $SF_6$ or $CF_4$ are used as etching gases, whereby $O_2$, $N_2$, $H_2$ Ar, He are added for setting the required selectivities.

Since the layer structure in the manufacturing method of the invention can be deposited in a single step in a sputtering system without having to interrupt the vacuum, a cost-beneficial process management is possible.

Since the capacitor dielectric is contacted at both sides with low-impedance metal and the metal layers can in turn be contacted with low-impedance metal such as, for example, Al or diluted Al alloys, the finished multi-layer capacitor has an extremely low intermediate resistance. As a result thereof, the multi-layer capacitor is suitable for high-frequency or radio-frequency uses. Given employment of a conductive substrate, the one pole can be contacted via the back side of the layer structure.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for producing a multi-layer capacitor, comprising the steps of:
    applying a layer structure of conductor layers alternating with dielectric layers on a substrate, said conductor layers alternating as a first conductive layer of a first material and a second conductive layer of a second material, first and said second materials being mutually selectively etchable relative to each other;
    conducting a first etching to form a first opening completely through said layer structure using a first mask as an etching mask;
    conducting a second etching of said second material in said second conductive layers by selectively removing said second material in each second layer relative to said first material thereby creating first under-etchings in each second layer in said layer structure neighboring said first opening;
    conducting a third etching to form a second opening completely through in said layer structure using a second mask as a etching mask;
    conducting a fourth etching of said first material in said first conductive layers by selectively removing said first material in each first layer relative to said second material thereby creating second under-etchings in each first layer in said layer structure neighboring said second opening;
    forming a first contact in said first opening, said first contact contacting only said first material conductive layers due to said first under-etchings; and
    forming a second contact in said second opening, said second contact contacting only said second material conductive layers due to said second under-etchings.

2. Method according to claim 1, further defined by selectively conducting said second etching step and said fourth etching step for forming said under-etchings relative to said dielectric layers.

3. Method according to claim 1, further defined by forming said conductive layers of different metals.

4. Method according to claim 1, further defined by forming said first contact and said second contact by surface-wide, directed application and structuring of a contact layer.

5. Method according to claim 4, further defined by applying said contact layer by sputtering.

6. Method according to claim 4, further defined by applying said contact layer by vapor deposition.

7. Method according to claim 1, further defined by forming said first mask and said second mask by optical lithography.

8. Method according to claim 1, further defined by forming said first mask and said second mask by silk-screening.

9. Method according to claim 1, said applying step further defined by sputtering said first, second and dielectric layers.

10. Method according to claim 1, wherein the step of applying a layer structure is further defined by applying a layer structure having dielectric layers of $Si_3N_4$, first conductive layers of tungsten and said second conductive layers of a tungsten silicide onto a substrate.

11. Method according to claim 10, further defined by forming said second conductive layers of a tungsten silicide selected from the group consisting of $WSi_2$ and $WSi_{0.4}$.

12. Method according to claim 10, further defined by conducting said first etching step for forming said first opening and said third step for forming said second opening by a dry etching process with a fluorine-containing etching gas; and adding at least one gas from the group consisting of $O_2$, Ar, $N_2$, $H_2$, He to said etching gas for setting the selectivity in each of said second etching step and said fourth etching step.

13. Method according to claim 12, further defined by conducting said etching using a gas selected from the group consisting of $SF_6$ or $CF_4$ as said etching gas.

14. Method according to claim 12 further defined by,
    adding $O_2$ in an amount between 10% and 50% in said second etching step for etching tungsten silicide; and
    adding $N_2$ in an amount between 30% and 70% in said fourth etching step for etching tungsten.

15. Method according to claim 1, wherein the step of applying a layer structure is further defined by applying a layer structure having dielectric layers of $Ta_2O_5$, first conductive layers of Ta; and second conductive layers of TaN on a substrate.

16. Method according to claim 15, further defined by conducting said etching using a gas selected from the group consisting of $SF_6$ or $CF_4$ as said etching gas.

17. Method according to claim 15, further defined by,
    adding $O_2$ in an amount between 10% and 50% in said second etching step for etching TaN; and
    adding $N_2$ in an amount between 30% and 70% in said fourth etching step for etching Ta.

* * * * *